US008738782B1

(12) United States Patent
Lang

(10) Patent No.: US 8,738,782 B1
(45) Date of Patent: May 27, 2014

(54) METHOD AND APPARATUS FOR DETECTING SESSION HIJACKING IN WEB-BASED APPLICATIONS

(75) Inventor: David E. Lang, Simi Valley, CA (US)

(73) Assignee: Intuit Inc., Mountain View, CA (US)

( * ) Notice: Subject to any disclaimer, the term of this patent is extended or adjusted under 35 U.S.C. 154(b) by 440 days.

(21) Appl. No.: 12/327,285

(22) Filed: Dec. 3, 2008

(51) Int. Cl.
*G06F 15/16* (2006.01)

(52) U.S. Cl.
USPC .............................. 709/228; 709/225; 726/7

(58) Field of Classification Search
USPC .................. 709/228, 225, 229; 726/22–27
See application file for complete search history.

(56) References Cited

U.S. PATENT DOCUMENTS

| 7,730,523 | B1 * | 6/2010 | Masurkar ........................... 726/4 |
| 7,849,318 | B2 * | 12/2010 | Zhang et al. .................. 713/176 |
| 2005/0188423 | A1 * | 8/2005 | Motsinger et al. .............. 726/22 |
| 2007/0234409 | A1 * | 10/2007 | Eisen ................................. 726/6 |
| 2008/0034424 | A1 * | 2/2008 | Overcash et al. ................ 726/22 |
| 2011/0188653 | A1 * | 8/2011 | Yao et al. ....................... 380/255 |

* cited by examiner

*Primary Examiner* — Patrice Winder
*Assistant Examiner* — Eyob Hagos
(74) *Attorney, Agent, or Firm* — Park, Vaughan, Fleming & Dowler LLP

(57) ABSTRACT

One embodiment of the present invention provides a system for detecting session hijacking of web-based applications. During operation, the system receives a request from a client at a server, wherein the request comprises a session cookie associated with a session and the client. Next, the system analyzes the session cookie to retrieve an order identifier for the session cookie. Note that the order identifier is generated when the session cookie is submitted to the server. The system then compares the order identifier from the session cookie with order identifiers for previously received session cookies for the session to determine if the session cookie was submitted after all of the previously received session cookies. If so, the system fulfills the request, generates a new session cookie with a new order identifier, and sends the new session cookie to the client. However, if the session cookie was not submitted after all of the previously received session cookies, the system indicates that the session has been hijacked, and terminates the session.

14 Claims, 3 Drawing Sheets

METHOD AND APPARATUS FOR DETECTING SESSION HIJACKING IN WEB-BASED APPLICATIONS

BACKGROUND

Related Art

Many web-based applications employ server-side state management (SSSM) to keep track of session state information, including authentication status and user variables. By keeping session state information on a web server rather than on the client, developers can create web applications that are platform-independent without the need for specialized client code. However, server-side state management has some inherent problems.

For example, SSSM is typically accomplished by passing cookies between the web server and the client. The web server may create a cookie with order identifiers, and in some instances session state, which the web server then passes to the client. When the client sends a subsequent request to the web server, the client includes the cookie with the request so that the web server can identify the client and determine the current session state. If a malicious client intercepts this cookie and submits it to the web server, the web server can be tricked into thinking that the second client is actually the client. In this manner, a malicious client can hijack the session of an authorized client, and it is possible for both clients to interact with the web server while the web server thinks it is interacting with only the authorized client.

SUMMARY

One embodiment of the present invention provides a system for detecting session hijacking of web-based applications. During operation, the system receives a request from a client at a server, wherein the request comprises a session cookie associated with a session and the client. Next, the system analyzes the session cookie to retrieve an order identifier for the session cookie. Note that the order identifier is generated when the session cookie is submitted to the server. The system then compares the order identifier from the session cookie with order identifiers for previously received session cookies for the session to determine if the session cookie was submitted after all of the previously received session cookies. If so, the system fulfills the request, generates a new session cookie with a new order identifier, and sends the new session cookie to the client. However, if the session cookie was not submitted after all of the previously received session cookies, the system indicates that the session has been hijacked, and terminates the session.

In some embodiments of the present invention, the order identifier is assigned by the client when the session cookie is submitted to the server.

In some embodiments of the present invention, the order identifier comprises a timestamp to facilitate determining if the session cookie was submitted after all of the previously received session cookies.

In some embodiments of the present invention, the order identifier comprises a counter value that is incremented each time the session cookie is submitted to facilitate determining if the session cookie was submitted after all of the previously received session cookies.

In some embodiments of the present invention, the order identifier comprises an item from an ordered sequence to facilitate determining if the session cookie was submitted after all of the previously received session cookies.

In some embodiments of the present invention, if the session cookie was not submitted after all of the previously received session cookies that are associated with the session and received at the server, the system notifies an administrator.

In some embodiments of the present invention, if the session cookie was not submitted after all of the previously received session cookies that are associated with the session and received at the server, the system increases an audit level.

In some embodiments of the present invention, if the session cookie was not submitted after all of the previously received session cookies that are associated with the session and received at the server, the system sends a request to the client to authenticate with the server.

DETAILED DESCRIPTION

Figure 1:
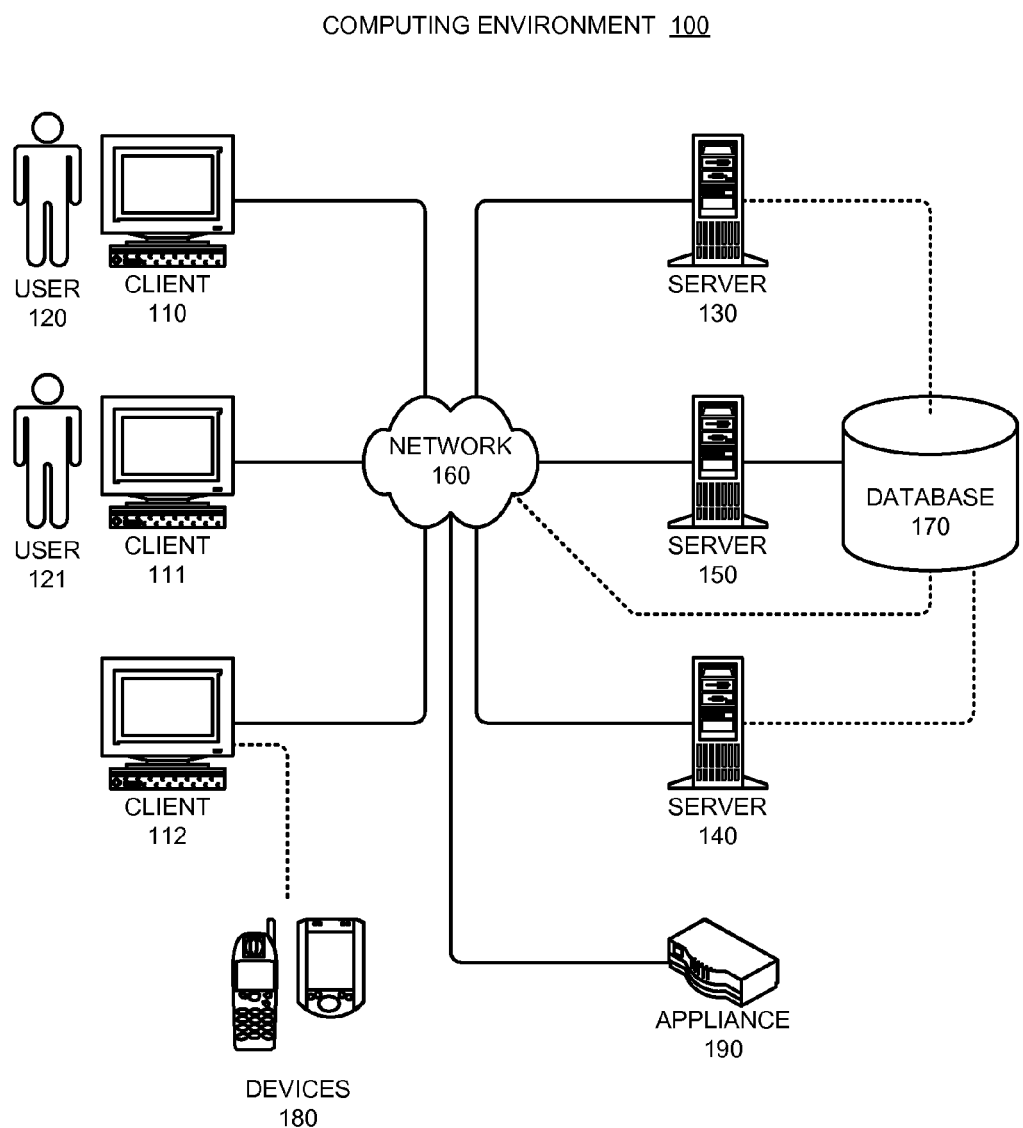
FIG. 1 illustrates a computing environment in accordance with an embodiment of the present invention.

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not limited to the embodiments shown, but is to be accorded the widest scope consistent with the principles and features disclosed herein.

The data structures and code described in this detailed description are typically stored on a computer-readable storage medium, which may be any device or medium that can store code and/or data for use by a computer system. The computer-readable storage medium includes, but is not limited to, volatile memory, non-volatile memory, magnetic and optical storage devices such as disk drives, magnetic tape, CDs (compact discs), DVDs (digital versatile discs or digital video discs), or other media capable of storing computer-readable media now known or later developed.

The methods and processes described in the detailed description section can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium.

Furthermore, the methods and processes described below can be included in hardware modules. For example, the hardware modules can include, but are not limited to, application-specific integrated circuit (ASIC) chips, field-programmable gate arrays (FPGAs), and other programmable-logic devices now known or later developed. When the hardware modules are activated, the hardware modules perform the methods and processes included within the hardware modules.

Overview

In existing SSSM systems, a server creates a session cookie that includes a timestamp indicating when the cookie was submitted. The server then checks this timestamp against a timeout when the cookie is submitted. Moreover, each action a user takes results in the generation of a new cookie with a new timestamp. However, this gives rise to a vulnerability in which a cookie that is stolen could be used by someone else until the timeout for that cookie is reached. Note that because when the cookie is used, the server generates a replacement cookie with a new timeout, the hijacking of the session can continue indefinitely.

One embodiment of the present invention provides a system for detecting session hijacking of web-based applications. During operation, the system receives a request from a client at a server, wherein the request comprises a session cookie associated with a session and the client. Next, the system analyzes the session cookie to retrieve an order identifier for the session cookie. Note that the order identifier is generated when the session cookie is submitted to the server. Also note that the order identifier may be created by the client. The system then compares the order identifier from the session cookie with order identifiers for previously received session cookies for the session to determine if the session cookie was submitted after all of the previously received session cookies. If so, the system fulfills the request, generates a new session cookie with a new order identifier, and sends the new session cookie to the client. However, if the session cookie was not submitted after all of the previously received session cookies, the system indicates that the session has been hijacked, and terminates the session.

In this embodiment, a record is kept on the server indicating the last timestamp that the client submitted a request to the server. If a new timestamp is received that is equal to or newer than the existing timestamp for the client, the associated request is allowed. If it is not equal to or newer than the existing timestamp, an alert is raised indicating that a session-hijack attack is in progress. The session is subsequently cleared from the server (terminating both the attacker's and the legitimate user's session, since the system cannot be sure which is which).

Note that by recording the time of the cookie that is submitted instead of when it is generated, parallel submissions are allowed, such as when multiple panes in a frameset request updates with the same cookie simultaneously.

In some embodiments of the present invention, the order identifier comprises a timestamp to facilitate determining if the session cookie was submitted after all of the previously received session cookies, while in other embodiments, the order identifier comprises a counter value that is incremented each time a session cookie is submitted. In other embodiments, the order identifier comprises an item from an ordered sequence. Note that the system can quickly determine if the session cookie was submitted at the same time as the previously received session cookies, or after all of the previously received session cookies were submitted.

In some embodiments of the present invention, if the session cookie was not submitted after all of the previously received session cookies that are associated with the session and received at the server were submitted, the system performs at least one of the following actions: notifying an administrator, increasing an audit level, and sending a request to the client to authenticate with the server.

Computing Environment

FIG. 1 illustrates a computing environment 100 in accordance with an embodiment of the present invention. Computing environment 100 includes a number of computer systems, which can generally include any type of computer system based on a microprocessor, a mainframe computer, a digital signal processor, a portable computing device, a personal organizer, a device controller, or a computational engine within an appliance. More specifically, referring to FIG. 1, computing environment 100 includes clients 110-112, users 120 and 121, servers 130-150, network 160, database 170, devices 180, and appliance 190.

Clients 110-112 can include any node on a network including computational capability and including a mechanism for communicating across the network. Additionally, clients 110-112 may comprise a tier in an n-tier application architecture, wherein clients 110-112 perform as servers (servicing requests from lower tiers or users), and wherein clients 110-112 perform as clients (forwarding the requests to a higher tier).

Similarly, servers 130-150 can generally include any node on a network including a mechanism for servicing requests from a client for computational and/or data storage resources. Servers 130-150 can participate in an advanced computing cluster, or can act as stand-alone servers. In one embodiment of the present invention, server 140 is an online "hot spare" of server 150.

Users 120 and 121 can include: an individual; a group of individuals; an organization; a group of organizations; a computing system; a group of computing systems; or any other entity that can interact with computing environment 100.

Network 160 can include any type of wired or wireless communication channel capable of coupling together computing nodes. This includes, but is not limited to, a local area network, a wide area network, or a combination of networks. In one embodiment of the present invention, network 160 includes the Internet. In some embodiments of the present invention, network 160 includes phone and cellular phone networks.

Database 170 can include any type of system for storing data in non-volatile storage. This includes, but is not limited to, systems based upon magnetic, optical, or magneto-optical storage devices, as well as storage devices based on flash memory and/or battery-backed up memory. Note that database 170 can be coupled: to a server (such as server 150), to a client, or directly to a network.

Devices 180 can include any type of electronic device that can be coupled to a client, such as client 112. This includes, but is not limited to, cell phones, personal digital assistants (PDAs), smart-phones, personal music players (such as MP3 players), gaming systems, digital cameras, portable storage media, or any other device that can be coupled to the client. Note that in some embodiments of the present invention, devices 180 can be coupled directly to network 160 and can function in the same manner as clients 110-112.

Appliance 190 can include any type of appliance that can be coupled to network 160. This includes, but is not limited to, routers, switches, load balancers, network accelerators, and specialty processors. Appliance 190 may act as a gateway, a proxy, or a translator between server 140 and network 160.

Note that different embodiments of the present invention may use different system configurations, and are not limited to the system configuration illustrated in computing environment 100. In general, any device that is capable of communicating via network 160 may incorporate elements of the present invention.

For example, in some embodiments of the present invention, the web-based application is served entirely from appliance 190, while in other embodiments of the present invention, the web-based application is served from servers 130-150.

Apparatus

Figure 2:
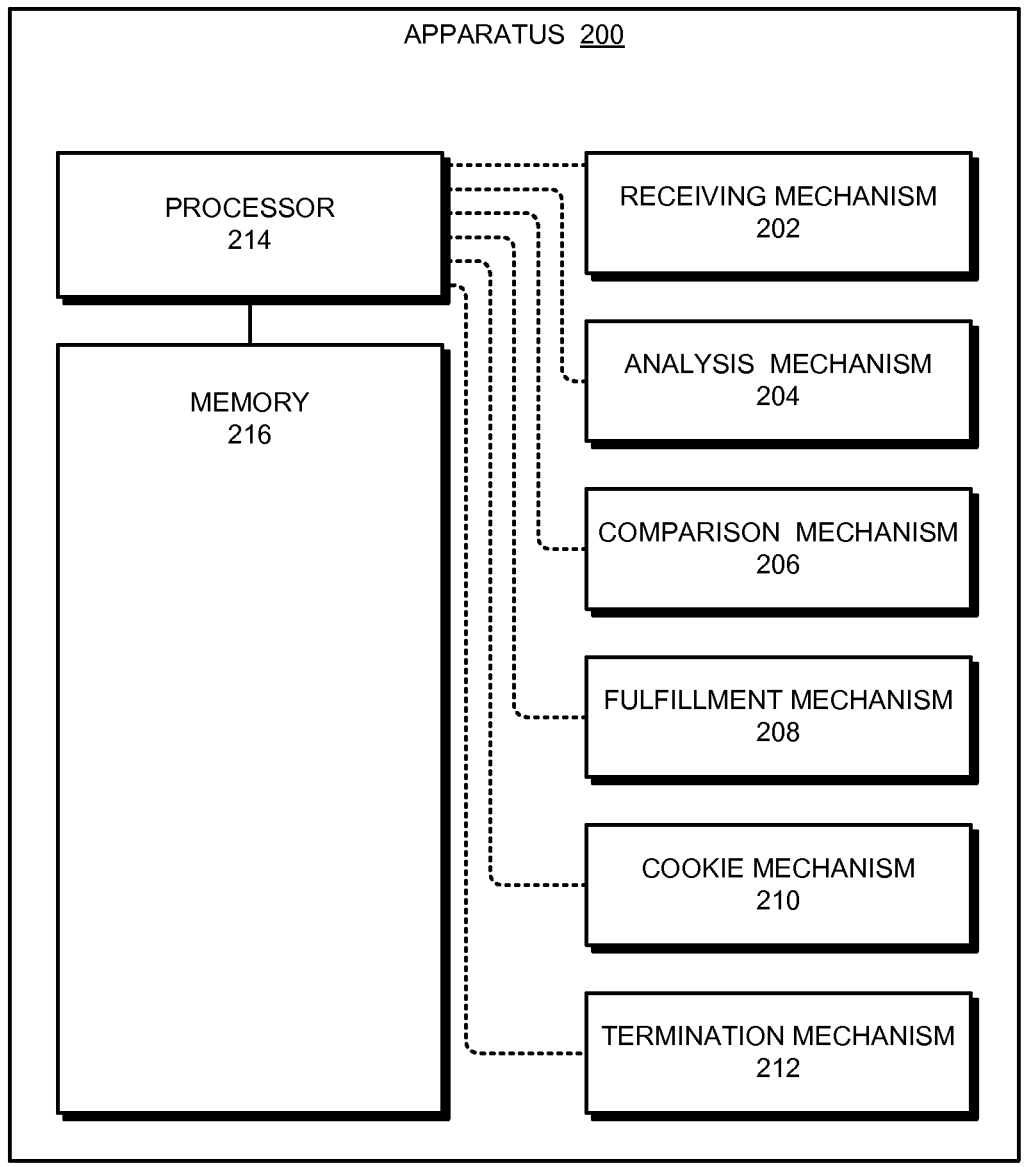
FIG. 2 illustrates an apparatus in accordance with an embodiment of the present invention.
Figure 3:
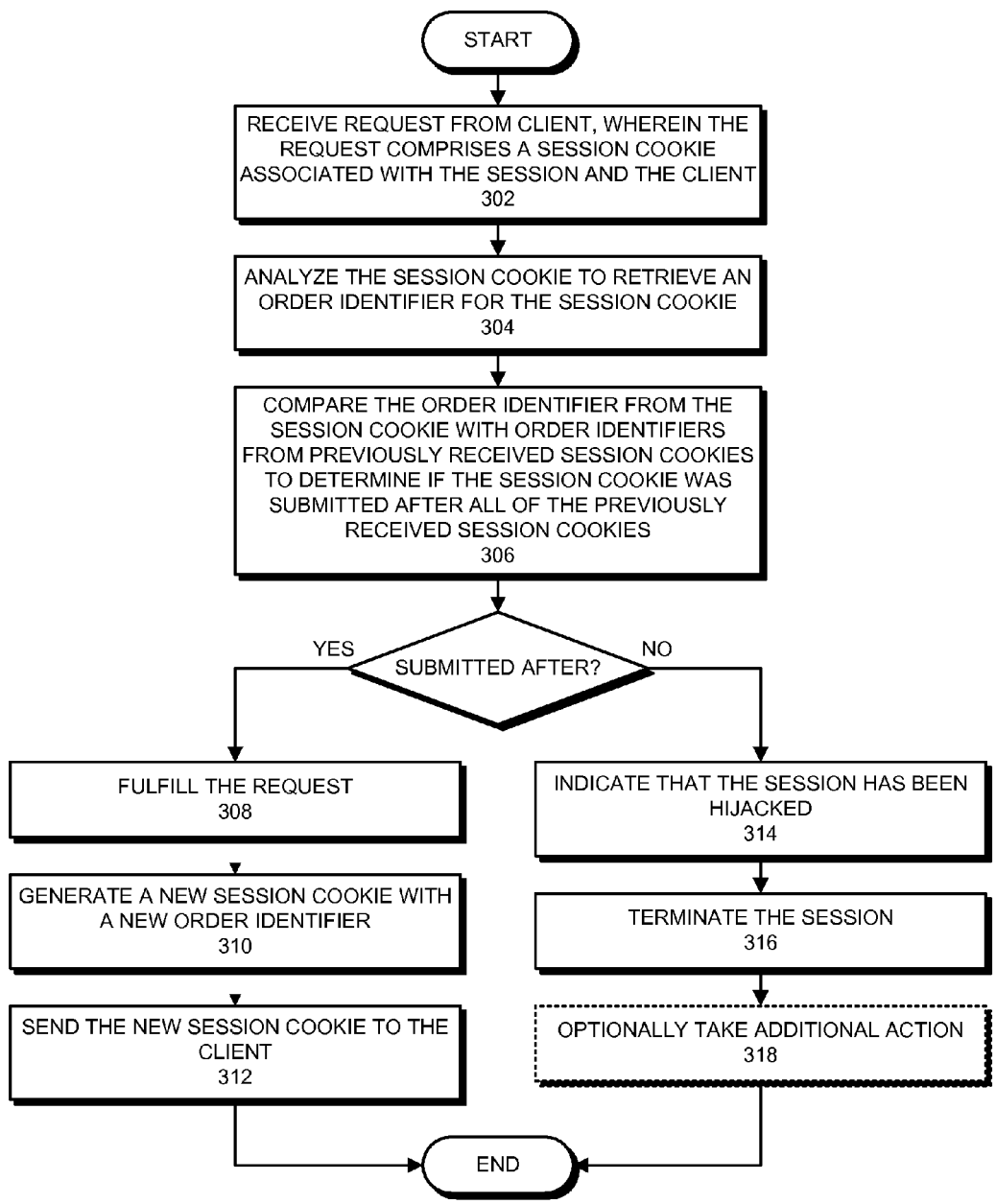
FIG. 3 presents a flow chart illustrating the process of detecting session hijacking of web-based applications in accordance with an embodiment of the present invention.

FIG. 2 illustrates an apparatus 200, and FIG. 3 presents an associated flow chart illustrating the process of detecting session hijacking of web-based applications in accordance with an embodiment of the present invention.

Apparatus 200, which, for example, can comprise server 150, database 170, appliance 190, client 110, devices 180, or any combination thereof, includes receiving mechanism 202, analysis mechanism 204, comparison mechanism 206, fulfillment mechanism 208, cookie mechanism 210, termination mechanism 212, processor 214, and memory 216.

During operation, receiving mechanism 202 receives a request from client 110, wherein the request comprises a session cookie associated with a session and the client (operation 302). Next, analysis mechanism 204 analyzes the session cookie to retrieve an order identifier for the session cookie (operation 304).

Note that as described previously, the order identifier can be any value that facilitates determining the order in which the session cookie was submitted to apparatus 200 with regards to other session cookies. For example, the order identifier can comprise a timestamp, a counter value that is incremented each time a session cookie is submitted, or an item from any ordered sequence.

Comparison mechanism 206 then compares the order identifier from the session cookie to order identifiers for previously received session cookies for the session to determine if the session cookie was submitted after all of the previously received session cookies (operation 306).

If so, fulfillment mechanism 208 fulfills the request (operation 308), and cookie mechanism 210 generates a new session cookie with a new order identifier (operation 310) and sends the new session cookie to client 110 (operation 312).

If the session cookie was not submitted after all of the previously received session cookies, termination mechanism 212 indicates that the session has been hijacked (operation 314), and terminates the session (operation 316). Optionally, termination mechanism 212 can take additional actions as necessary (operation 318), such as increasing an audit level, notifying an administrator, or requiring user 110 to re-authenticate to apparatus 200.

As long as apparatus 200 receives session cookies that were submitted at the same time or after any of the session cookies already submitted, apparatus 200 can be reasonably assured that the current session is not hijacked. Once apparatus 200 receives a session cookie that was submitted prior to other session cookies already received by apparatus 200, alarms should be raised indicating that the session has been compromised.

In one example, user 120 is interacting with a web-based application served by server 150 via client 110. As client 110 sends requests to server 150, server 150 analyzes the session cookies received with the requests to ensure that each session cookie was submitted at the same time or after all other session cookies received at server 150 at that particular instance of time.

In this example, consider where the order identifier is a counter value that is initialized with the value of 1. Client 110 might send subsequent requests with order identifiers 2, 3, 3, 3, 4, 5, 6, 7, 7, 7, 7, 8, 9, 10, and 10. As long as server 150 sees the same or an increasing value for the order identifier, server 150 can trust the validity of the session.

Now, consider a case where user 121 uses client 111 to intercept a cookie from client 110 with the order identifier 4. Client 111 then sends a new request to server 150 with the order identifier 5, but the new request is received after server 150 receives a request with order identifier 6 from client 110. Because the order identifiers are received out-of-order, server 150 indicates that the session has been hijacked and takes appropriate action.

The foregoing descriptions of embodiments of the present invention have been presented only for purposes of illustration and description. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A method for detecting session hijacking of web-based applications, the method comprising:
    receiving a request from a client at a server, wherein the request comprises a session cookie associated with a session and the client;
    analyzing the session cookie to retrieve an order identifier for the session cookie, wherein the order identifier is generated at a time when the session cookie is submitted to the server, and wherein the order identifier comprises at least one of:
    a timestamp to facilitate determining if the session cookie was submitted after all of the previously received session cookies, or
    a counter value that is incremented each time a session cookie is submitted to facilitate determining if the session cookie was submitted after all of the previously received session cookies;
    comparing the order identifier from the session cookie with order identifiers for previously received session cookies for the session, wherein said comparing includes:
    determining if the first order identifier is greater than all of the previously received order identifiers, and
    determining if the order identifier is equal to the greatest of the previously received order identifiers; and
    if the order identifier is not greater than all of the previously received order identifiers, and is not equal to the greatest of the previously received order identifiers, indicating that the session has been hijacked, terminating the session, and notifying an administrator.

2. The method of claim 1, wherein if the session cookie was submitted after all of the previously received session cookies, the method further comprises:
    fulfilling the request;
    generating a new session cookie with a new order identifier; and
    sending the new session cookie to the client.

3. The method of claim 1, wherein the order identifier is assigned by the client when the session cookie is submitted to the server.

4. The method of claim 1, wherein the order identifier comprises an item from an ordered sequence to facilitate determining if the session cookie was submitted after all of the previously received session cookies.

5. The method of claim 1, wherein if the session cookie was not submitted after all of the previously received session cookies that are associated with the session and received at the server, the method further comprises increasing an audit level.

6. The method of claim 1, wherein if the session cookie was not submitted after all of the previously received session cookies that are associated with the session and received at the server, the method further comprises sending a request to the client to authenticate with the server.

7. A non-transitory computer-readable storage medium storing instructions that when executed by a computer cause the computer to perform a method for detecting session hijacking of web-based applications, the method comprising:

receiving a request from a client at a server, wherein the request comprises a session cookie associated with a session and the client;

analyzing the session cookie to retrieve an order identifier for the session cookie, wherein the order identifier is generated at a time when the session cookie is submitted to the server, and wherein the order identifier comprises at least one of:

a timestamp to facilitate determining if the session cookie was submitted after all of the previously received session cookies, or a counter value that is incremented each time a session cookie is submitted to facilitate determining if the session cookie was submitted after all of the previously received session cookies;

comparing the order identifier from the session cookie with order identifiers for previously received session cookies for the session, wherein said comparing includes:

determining if the first order identifier is greater than all of the previously received order identifiers, and determining if the order identifier is equal to the greatest of the previously received order identifiers; and if the order identifier is not greater than all of the previously received order identifiers, and is not equal to the greatest of the previously received order identifiers, indicating that the session has been hijacked, an terminating the session, and notifying an administrator.

8. The computer-readable storage medium of claim 7, wherein if the session cookie was submitted after all of the previously received session cookies, the method further comprises:

fulfilling the request;

generating a new session cookie with a new order identifier; and sending the new session cookie to the client.

9. The computer-readable storage medium of claim 7, wherein the order identifier is assigned by the client when the session cookie is submitted to the server.

10. The computer-readable storage medium of claim 7, wherein the order identifier comprises an item from an ordered sequence to facilitate determining if the session cookie was submitted after all of the previously received session cookies.

11. The computer-readable storage medium of claim 7, wherein if the session cookie was not submitted after all of the previously received session cookies that are associated with the session and received at the server, the method further comprises increasing an audit level.

12. The computer-readable storage medium of claim 7, wherein if the session cookie was not submitted after all of the previously received session cookies that are associated with the session and received at the server, the method further comprises sending a request to the client to authenticate with the server.

13. An apparatus configured for detecting session hijacking of web-based applications, comprising:

a receiving mechanism configured to receive a request from a client at a server, wherein the request comprises a session cookie associated with a session and the client;

analyzing the session cookie to retrieve an order identifier for the session cookie, wherein the order identifier is generated at a time when the session cookie is submitted to the server, and wherein the order identifier comprises at least one of:

a timestamp to facilitate determining if the session cookie was submitted after all of the previously received session cookies, or a counter value that is incremented each time a session cookie is submitted to facilitate determining if the session cookie was submitted after all of the previously received session cookies;

a comparison mechanism configured to compare the order identifier from the session cookie to order identifiers for previously received session cookies for the session, wherein said comparing includes:

determining if the order identifier is greater than all of the previously received order identifiers, and determining if the order identifier is equal to the greatest of the previously received order identifiers; and a termination mechanism configured to indicate that the session has been hijacked, terminate the session, if the order identifier is not greater than all of the previously received order identifiers, and is not equal to the greatest of the previously received order identifiers.

14. The apparatus of claim 13, further comprising:

a fulfillment mechanism configured to fulfill the request if the session cookie was submitted after all of the previously received session cookies; and a cookie mechanism configured to generate a new session cookie with a new order identifier, and send the new session cookie to the client if the session cookie was submitted after all of the previously received session cookies.

* * * * *